United States Patent [19]

Ichihara

[11] Patent Number: 4,845,412
[45] Date of Patent: Jul. 4, 1989

[54] SPEED CONTROL APPARATUS FOR MOTOR

[75] Inventor: Akira Ichihara, Kakuda, Japan

[73] Assignee: Alps Electric Co., Ltd., Japan

[21] Appl. No.: 118,848

[22] Filed: Nov. 9, 1987

[30] Foreign Application Priority Data

Feb. 25, 1987 [JP] Japan .............................. 62-27165[U]

[51] Int. Cl.$^4$ ............................................. H02P 5/00
[52] U.S. Cl. ................... 388/832; 388/910; 388/915
[58] Field of Search .................. 318/309–318, 318/326–328, 329

[56] References Cited

U.S. PATENT DOCUMENTS

| | | | |
|---|---|---|---|
| 3,629,633 | 12/1971 | Callaghan | 318/317 |
| 4,039,911 | 8/1977 | Tanikoshi | 318/286 |
| 4,072,886 | 2/1978 | Dammeyer | 318/602 |
| 4,259,623 | 3/1981 | Moeder et al. | 318/331 |
| 4,272,709 | 6/1981 | Mizumoto et al. | 318/317 |
| 4,553,209 | 11/1985 | Hyodo et al. | 318/317 |

Primary Examiner—William M. Shoop, Jr.
Assistant Examiner—D. Martin
Attorney, Agent, or Firm—Guy W. Shoup; Paul J. Winters; Brian D. Ogonowsky

[57] ABSTRACT

In a motor speed control apparatus for a DC motor, there are provided a frequency signal generating circuit for outputting a signal at a time period corresponding to a rotation speed of a motor, a sawtooth wave output circuit for outputting a sawtooth wave, the voltage of which increases in a constant time-constant at said time period, a holding circuit for holding a substantially peak voltage of said sawtooth wave as a signal voltage corresponding to the rotation speed of the motor, a differential amplifier circuit for comparing said signal voltage with a speed setting voltage and for outputting a speed control signal in accordance with a difference in this comparison, said speed control signal being supplied to a motor drive apparatus, an amplifier circuit interposed between the output of said holding circuit and input of said differential amplifier circuit, and an operation control circuit for controlling said amplifier circuit to an operative mode and a non-operative mode selectively, the motor being driven by switching said amplifier circuit into the operative mode by means of said operation control circuit.

4 Claims, 3 Drawing Sheets

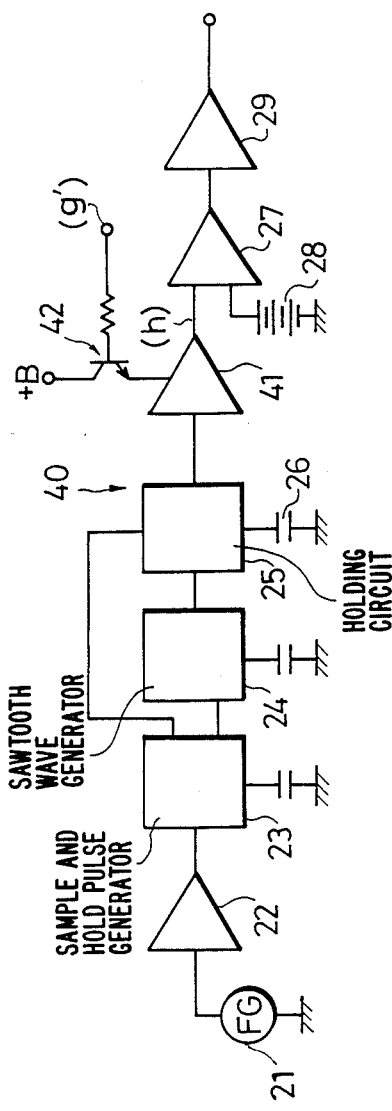

SPEED CONTROL APPARATUS FOR MOTOR

BACKGROUND OF THE INVENTION

1. Field of the Invention

The present invention relates to a motor speed control apparatus where a motor immediately starts to rotate upon receipt of a starting signal.

2. Description of Prior Art

FIG. 3 shows a circuit diagram of one of the conventional motor speed control apparatus and also the conventional motor drive apparatus. In FIG. 3, first, the conventional motor drive apparatus 1 will now be described. A voltage (+B) is applied to each of Hall sensors 2 to 4 for detecting the rotation speed of the motor, and signals corresponding to impedance changes of these Hall sensors 2 to 4 are respectively amplified and then input into a logic circuit 8. Thereafter, from this logic circuit 8 to amplifiers 9 to 11, periodical signals corresponding to the rotation speed of the motor are sequentially supplied. To these amplifiers 9 to 11, speed control signals are supplied from the motor speed control apparatus 20. Impedances of PNP transistors 12 to 14 are lowered in accordance with the amplitudes of the speed control signals only while the signals from the amplifiers 9 to 11 are being supplied thereto, and accordingly, motor drive currents corresponding to shifts of the motor rotation speed from a motor setting speed flow through motor coils 15 to 17. It should be noted that resistors 18 to 20 function as biasing resistors by which the PNP transistors 12 to 14 are not conducted while the signals are not output from the amplifiers 9 to 11.

Referring now to a waveform shown in FIG. 4, the motor speed control apparatus 20 will be described. A sine wave, as illustrated in FIG. 4a, is supplied to a waveform shaping circuit 22 in response to the motor rotation speed from a frequency signal generating circuit (e.g., a frequency generator etc.) coupled to the motor. A rectangular wave, as shown in FIG. 4b, is supplied from this waveform shaping circuit 22 to a sample-and-hold pulse generator 23. As a result, the sample-and-hold pulse generator 23 supplies a sampling pulse, as illustrated in FIG. 4c, to a sawtooth wave generator 24 simultaneously upon receipt of the rising edge of the rectangular wave, and supplies a holding pulse, as represent in FIG. 4d, to a holding circuit 25 at a slightly earlier time instance than the rising edge of the rectangular wave. In addition, the sawtooth wave generator 24 outputs a sawtooth wave, as indicated in FIG. 4e, the voltage of which increases at a constant time-constant in synchronism with the sampling pulse, and thereafter supplies the sawtooth wave to the holding circuit 25. Then, the holding circuit 25 will hold a substantially, or near peak voltage of the sawtooth wave by means of a capacitor 26 in response to a holding pulse. Since the discharging time constant of this capacitor 26 is great, the voltage across the capacitor 26 is not practically changed at the sampling pulse period. Then, the voltage across this capacitor 26 is applied as a signal voltage illustrated in FIG. 4f from the holding circuit 25 to a plus (positive) input terminal of a differential amplifier circuit 27. A speed setting voltage "S" applied from a speed setting circuit 28 is applied to a minus (negative) input terminal of the differential amplifier circuit 27 so as to set the rotation speed of the motor. Then, a difference between the signal voltage output from the holding circuit 25 and the speed setting voltage is amplified in the differential amplifier circuit 27 and thereafter applied as a speed control signal to the motor drive circuit 1 via a buffer circuit 29.

When the rotation speed of the motor is slow, the period of the sampling pulse becomes long, and the signal voltage output from the holding circuit 25 becomes also high. Accordingly, when the rotation speed of the motor is slower than the setting speed, the speed control signal of the higher voltage is supplied to the motor drive circuit 1 so as to control the motor to be rotated at a more higher speed. It should be noted that the terminal of the capacitor 26 at the side of the holding circuit 25 is grounded via a switch 30, which forms an operation control circuit.

FIG. 5 is a detailed circuit diagram of the above-described conventional operation control circuit. In FIG. 5, the terminal of the capacitor 26 at the side of the holding circuit 25 is grounded via a first NPN transistor 31. A base of this NPN transistor 31 is connected via a resistor 32 to the power supply (+B) and grounded via a second NPN transistor 33. A base of the second NPN transistor 33 is connected in series with the power supply (+B) via a third NPN transistor 34 and a resistor 35.

When the signal supplied to the base of the third NPN transistor 34 is "L" as illustrated in FIG. 6, the second NPN transistor 33 is not conducted whereas the first NPN transistor 31 is conducted, so that the capacitor 26 is brought into a shortcircuit condition and thus, no speed control signal is output. When the signal (G) is inverted to "H" as the starting signal, the third transistor 33 is conducted and the first NPN transistor 31 becomes non-conductive. Then, the capacitor 26 begins to be charged, as illustrated in FIG. 6 (F), by the higher voltage applied from the sawtooth wave generator 24. When the voltage across the capacitor 26 exceeds the speed setting voltage "S", the speed control signal is output and therefore the motor driving operation starts.

As previously described, when the voltage across the capacitor 26 exceeds the speed setting voltage "S" after the charging operation of the capacitor 26 starts in response to the starting signal, the motor driving operation will start. However, since the rotation speed of the motor is slow due to just after the motor starting, the period of the sampling pulse becomes long and furthermore, the capacitor 26 is charged so that the voltage across the capacitor 26 is coincident with the speed setting voltage "S" after a predetermined time lapse. As a result, a time period "$t_1$" for which the motor reaches a stable speed, is required longer than the charging time of the capacitor 26. In general, this time period must be considerably longer than the charging time.

To solve the above-described conventional problem involved in the prior art motor speed control apparatus, an object of the present invention is to provide a motor speed control apparatus for simultaneously starting the motor upon receipt of the starting signal.

SUMMARY OF THE INVENTION

To accomplish the above-described object, a motor speed control apparatus according to the present invention comprises a frequency signal generating circuit for outputting a signal at a time period corresponding to a rotation speed of a motor;

a sawtooth wave output circuit for outputting a sawtooth wave, the voltage of which increases in a constant time-constant at said time period;

a holding circuit for holding a substantially peak voltage of said sawtooth wave at a signal voltage corresponding to the rotation speed of the motor;

a differential amplifier circuit for comparing said signal voltage with a speed setting voltage and for outputting a speed control signal in accordance with a difference in this comparison, said speed control signal being supplied to a motor drive apparatus;

an amplifier circuit interposed between the output of said holding circuit and input of said differential amplifier circuit; and an operation control circuit for controlling said amplifier circuit to an operative mode and a non-operative mode selectively, the motor being driven by switching said amplifier circuit into the operative mode by means of said operation control circuit.

In the motor speed control apparatus according to the present invention, both the operative mode and non-operative mode of the amplifier circuit connected to the output of the holding circuit are switched by the operation control circuit, so that when this amplifier circuit is brought into the non-operative mode, the speed control signal is not output and therefore the motor is not driven. Then, the capacitor of the holding circuit is charged to a predetermined voltage. When the amplifier circuit is brought into the operative mode by the operation control circuit in response to the starting signal, the speed control signal is immediately supplied to the motor drive circuit by the voltage across the charged capacitor so as to start the motor driving operation.

BRIEF DESCRIPTION OF THE DRAWINGS

For a better understanding of this and other objects of the present invention, reference is made to the following detailed description of the invention to be read in conjunction with the following drawings, in which:

FIG. 1 is a schematic block diagram of the major portion of the motor speed control apparatus according to the present invention;

FIG. 2 represents waveforms for explaining various operations when the starting signal is received;

FIG. 6 illustrates waveforms for explaining various operations of the conventional apparatus upon receipt of the starting signal.

DETAILED DESCRIPTION OF THE PREFERRED EMBODIMENTS

Referring now to FIGS. 1 and 2, preferred embodiments according to the present invention will be described. FIG. 1 is a block circuit diagram of the major portion of the motor speed control apparatus according to the invention, whereas FIG. 2 indicates waveforms for explaining various operations upon receipt of the starting signal.

Figure 3:
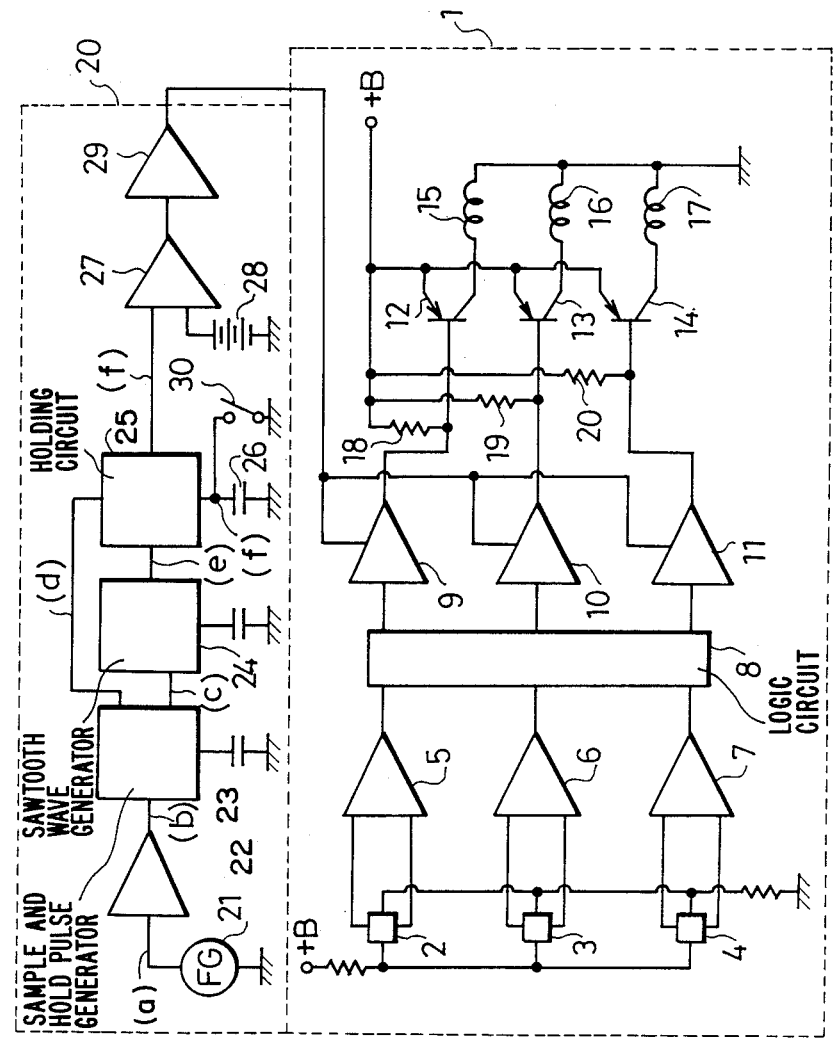
FIG. 3 is a schematic block circuit diagram of one of the conventional motor speed control apparatus and the conventional motor driving apparatus.
Figure 4:
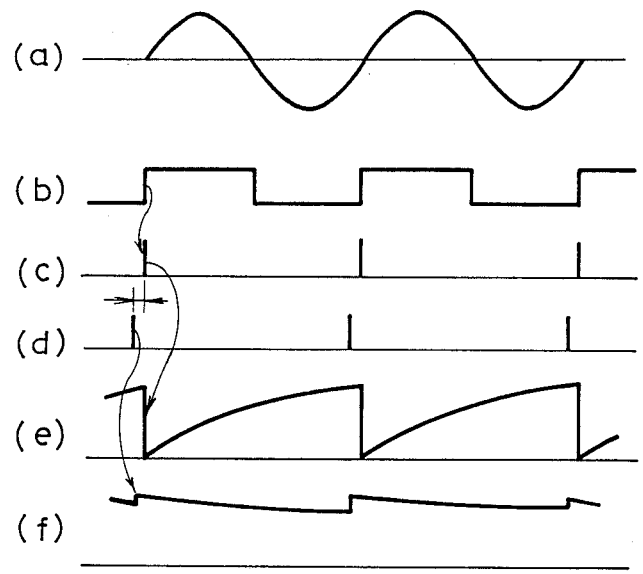
FIG. 4 represents waveforms for explaining various operations of the conventional motor speed control apparatus.
Figure 5:
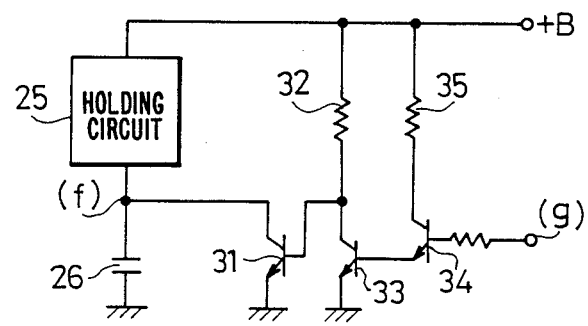
FIG. 5 is a detailed circuit diagram of the conventional operation control circuit shown in FIG. 3.

It should be noted that the same circuit blocks shown in FIG. 1 are denoted by the same reference numerals shown in FIG. 3 and the descriptions thereof are omitted in the specification.

Differences between the motor speed control apparatus 40 shown in FIG. 1 and the conventional motor speed control apparatus 20 are as follows. That is to say, the switch 30 shown in FIG. 3 is omitted, an amplifier circuit 41 is interposed between the holding circuit 25 and the differential amplifier circuit 27, which is controlled by an operation control circuit 42 into the operative mode and the non-operative mode, selectively.

With this circuit arrangement, when the signal (g') supplied to the operation control circuit 42 becomes "L" as represented in FIG. 2, the amplifier circuit 41 is under the non-operative condition, or mode, so that no signal from the holding circuit 25 is transported to the differential amplifier circuit 27 and no speed control signal is output therefrom. Then, the higher voltage across the capacitor 26 is charged by the high voltage applied from the sawtooth wave generator 24. When the signal (g') as the starting signal is inverted into "H", the amplifier circuit 41 is brought into the operative condition, or mode, and thus, the high voltage across the capacitor 26 is applied as the signal of the holding circuit 26, as illustrated in FIG. 2 (h), to the differential amplifier circuit 27. As a result, the speed control signal is immediately output from the differential amplifier circuit 27 via the buffer circuit 27 so as to start the motor driving. Thereafter, when the voltage across the capacitor 26 is gradually lowered and will be coincident with the speed setting voltage "S", the motor is driven at a stable rotation speed. Consequently, a time period "$t_2$" for which the motor speed reaches the stable speed is shorter than that of the conventional speed control apparatus.

In the above-described preferred embodiment, the capacitor 26 was charged by the voltage applied from the sawtooth wave generator 24. It should be noted that the capacitor 26 may be charged by the power supply (+B) via a resistor having a proper resistance value when the motor is under the stop condition. Moreover, in the above-described preferred embodiment, the amplifier circuit 41 was interposed between the holding circuit 25 and the differential amplifier circuit 27. The present invention is not limited to the above preferred embodiment. The operation modes of the amplifier circuit succeeded by the holding circuit 25, for instance, the amplifier circuits constituting the buffer circuit 29, or the differential amplifier circuit 27, may be selected by the operation control circuit 42.

As has been described in detail, the motor can be driven simultaneously upon receipt of the starting signal and thus, a time period for which the motor speed becomes a stable speed becomes shorter according to the invention. Moreover, even if the capacitance of the capacitor in the holding circuit is selected to be great in order to improve the servo performance, there is no delay in the motor starting operation.

What is claimed is:

1. A motor speed control apparatus comprising:
   a frequency signal generating circuit for outputting a signal at a time period corresponding to a rotation speed of a motor;
   a sawtooth wave output circuit for outputting a sawtooth wave, the voltage of which increases in a constant time-constant at said time period;
   a holding circuit for holding a substantially peak voltage of said sawtooth wave at a signal voltage corresponding to the rotation speed of the motor;
   a differential amplifier circuit for comparing said signal voltage with a speed setting voltage and for outputting a speed control signal in accordance with a difference in this comparison, said speed control signal being supplied to a motor drive apparatus;

an amplifier circuit interposed between the output of said holding circuit and input of said differential amplifier circuit; and an operation control circuit for controlling said amplifier circuit to an operative mode and a non-operative mode selectively, the motor being driven by switching said amplifier circuit into the operative mode by means of said operation control circuit.

2. A motor speed control apparatus as claimed in claim 1, wherein said holding circuit includes a capacitor charged by said sawtooth wave output from said sawtooth wave output circuit.

3. A motor speed control apparatus as claimed in claim 1, wherein said amplifier circuit is constructed of an operational amplifier.

4. A motor speed control apparatus as claimed in claim 1, wherein said operation control circuit is constructed of an NPN transistor, the base of which receives a control signal to selectively switch said amplifier circuit into the operative mode and the non-operative mode.

* * * * *